No. 791,872. PATENTED JUNE 6, 1905.
F. C. BROWN.
APPARATUS FOR CIRCULATING AND MIXING CRUSHED ORE.
APPLICATION FILED JAN. 3, 1905.

2 SHEETS—SHEET 1.

Witnesses:

Inventor
Frederick C. Brown

No. 791,872. PATENTED JUNE 6, 1905.
F. C. BROWN.
APPARATUS FOR CIRCULATING AND MIXING CRUSHED ORE.
APPLICATION FILED JAN. 3, 1905.

2 SHEETS—SHEET 2.

Witnesses:
Inventor
Frederick C. Brown

No. 791,872. Patented June 6, 1905.

UNITED STATES PATENT OFFICE.

FREDERICK CAPEL BROWN, OF KOMATA, NEW ZEALAND.

APPARATUS FOR CIRCULATING AND MIXING CRUSHED ORE.

SPECIFICATION forming part of Letters Patent No. 791,872, dated June 6, 1905.

Application filed January 3, 1905. Serial No. 239,499.

*To all whom it may concern:*

Be it known that I, FREDERICK CAPEL BROWN, a citizen of the United States of America, residing at Komata, in the Provincial District of Auckland and Colony of New Zealand, have invented certain new and useful Improvements Relating to Apparatus for Circulating and Mixing Crushed Ore or other Materials in a Liquid or Semiliquid State, of which the following is a specification.

This invention has reference to an improved apparatus for circulating, agitating, and mixing crushed ore or the like in a liquid or semiliquid state by compressed air or gas, particularly adapted for use in metallurgy for treating sand or slimes or mixtures of the same, as required in the cyanid or other processes for the extracting or depositing of gold, silver, and other metals, though it may be used for other purposes, if required.

Heretofore many attempts have been made by the use of compressed air or gas to obtain an agitator which will not require revolving arms or fliers or other mechanical means as their agitating medium, so that the costly machinery necessary to work or rotate the same might be dispensed with. Such attempts, however, so far as I am aware, have not been successful, particularly for treating sands in metallurgical operations, unless the latter contained a large proportion of slimes, the air or gas usually finding its way through the material without properly agitating and mixing it, the tests having shown that the solution which collected at the bottom of the tank differed in strength and value from that at the top. According to my invention I overcome these objections and construct an agitator for the treatment of sand or slimes or mixtures of sand with slimes.

My invention is illustrated in the accompanying drawings, in which—

Figure 1:
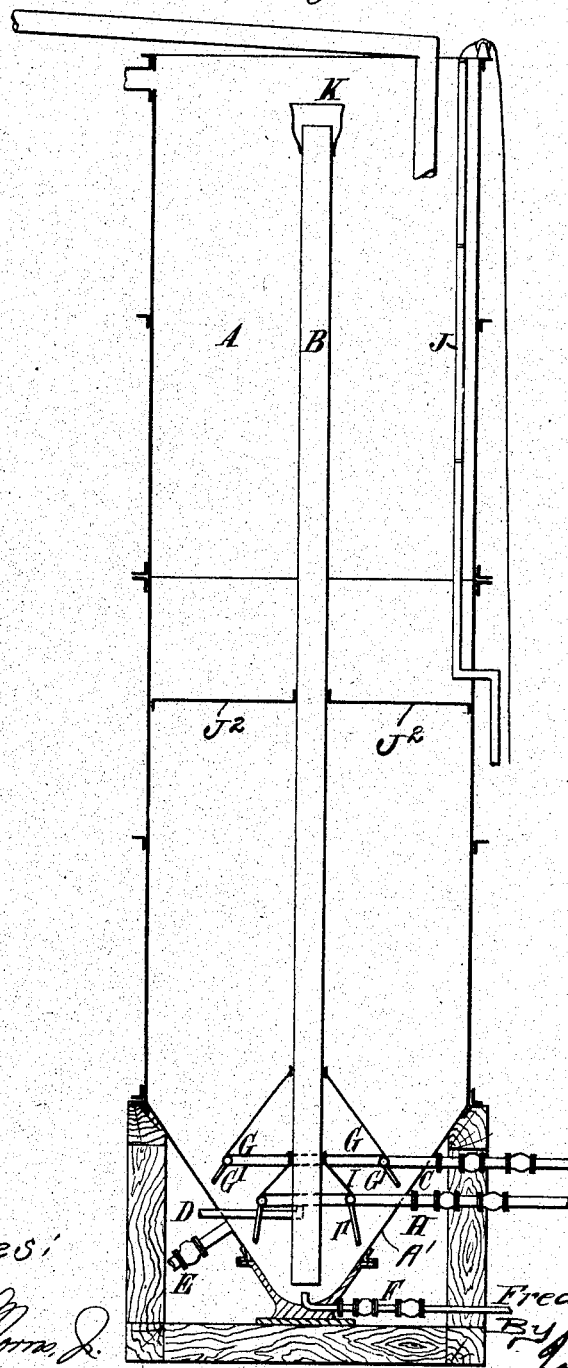
Figure 3:
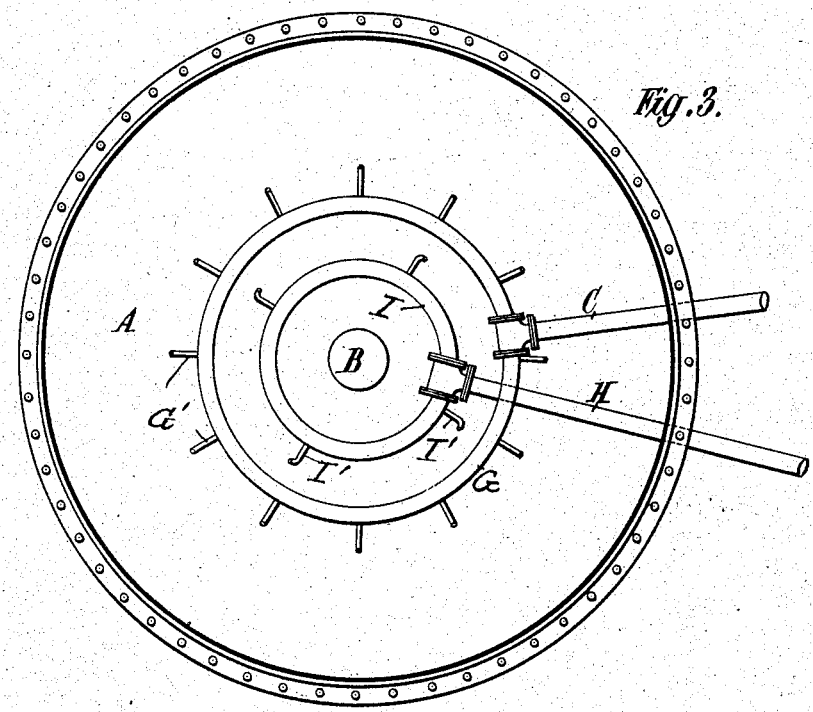
Figure 2:
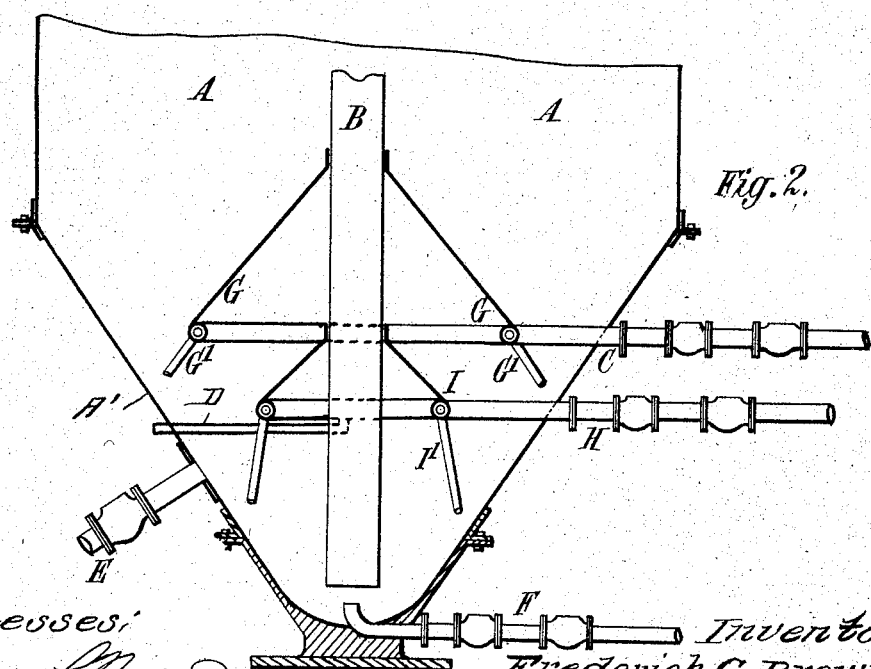

Figure 1 is an elevation of one form of agitator. Fig. 2 is a vertical section of the lower portion of the same drawn to an enlarged scale. Fig. 3 is a plan of the cone shown in Fig. 2.

The agitator is a tall cylindrical vertical tank or vessel A, in which is centrally mounted or held in position a material-conducting tube or pipe B, which extends upwardly from near the bottom of the tank or vessel to a point near the upper part or top of such tank. C is a pipe for introducing liquid near the bottom of the said tank. D is a pipe for introducing liquid into the central pipe. E is a discharge-pipe. F is an air-pipe. G is a circular pipe for distributing liquid in tank. The lower part of the said tank is conical, as shown at A', and the bottom thereof has fitted thereto a cap or other closing device for emptying the tank, and, if desired, it can be arranged to act as a concentrator.

In the upper portion of the conical part of the tank A' and encircling the tube or pipe B devices are provided for allowing the conical sides of the tank to be kept flushed with water or solution as and when required. The said devices may comprise in some instances one or more circular tubes or pipes having nozzles or taps which cause the liquid to impinge upon the interior of the conical part of the tank. The bottom of the said central tube or pipe B also has an air-supply pipe F in communication therewith, so as to admit air into the said central tube or pipe in the manner hereinafter explained.

J denotes a sectional decanting-pipe of any suitable construction, and $J^2$ denotes a plurality of stay-rods acting as a suspension means for the pipe B.

The material to be treated can either be pumped in at the bottom of the vessel or filled in at the top—that is to say, in the annular space between the central tube or pipe B and the wall of the tank A.

In operation the tank is filled with material usually in a more or less semiliquid state. It is allowed to settle in the tank, so as to drain off the top liquid which collects during the settlement of the material. After the withdrawal of the top liquid sufficient space is left for the subsequent solution and washes required. Solution or liquid is then introduced to the tank through the solution-pipe C, supplying the circular pipe G, discharging through jets G'. The solution is allowed to flow into the said tank until it has risen therein to a height within a short distance from the top of the central tube or pipe B. Compressed air is then admitted to the said central pipe through the aforesaid air-admission tube or tubes F, with the result that a mixture of sand, solution, and air rises through and is discharged from the top of the central pipe B. The solution or liquid issuing from the circular pipe G through the small pipes, spouts or nozzles, or other devices G' impinges on the sides or wall of the conical part of the tank and causes the body of the sand or like material in the tank to settle down, the whole charge becoming a homogeneous mixture of solution and sand, as it is drawn into the bottom of the central tube or pipe and delivered at the top of the tank so rapidly that no opportunity to settle is afforded. As soon as the surface of the mixture in the tank has risen to the top of the central pipe B the solution is shut off from the circular pipe G, and the circulation of the mixture will go on as long as required by the agency of the compressed air or gas. After the agitation has once been started a perfect circulation is obtained. When the material has circulated for a sufficient length of time, the air is shut off and the charge allowed to settle, when the solution is decanted off. Lime may be added to the solution to accelerate the settling of the slimes. In discharging the tank it is only necessary to open the discharge gate or pipe, as will be readily understood, and to pass water through the circular pipe, so as to thoroughly flush the tank. In some instances I may fit the upper part of the said central tube or pipe B with a removable cap or other closing device K for preventing material falling back into the said central pipe. The said central pipe may also be fitted with appropriate deflectors or other devices to direct the particles of sand or other material which issues from the central pipe B well away from the discharge of such central tube.

In some cases I may provide the tank with an interior vessel or chamber which has nozzles or apertures for the admission of liquid to the conical part of the tank. The said interior vessel is placed in communication with the common supply of liquid or solution and may be used instead of or in addition to the circular tube or pipes above described. The said interior vessel may be fitted to the tank in any appropriate manner and may, if preferred, be made in one piece with the said tank.

According to my invention it will be found that a thorough agitation of every particle of the material in solution with the air is effected and a better settlement on account of the depth of the tank is attained.

The said apparatus is simple in construction, and therefore economical to manufacture. There are no wearing parts to get out of order.

A further advantage of my invention is that the apparatus can stand on a very small space. Large or small plants may be equally well handled, and very little power is required for the compression of the air or gas except just at the starting of the agitation.

It will be found that according to my invention sand and slimes can be more effectively treated than heretofore.

What I claim, and desire to secure by Letters Patent of the United States, is—

1. In an apparatus of the character described, a tank having a conical bottom and adapted to receive the material to be treated, a conducting-pipe suspended centrally therein, pipes arranged within the tank for discharging fluid therein near the bottom thereof to bring the material to a fluid state, and means for discharging air into the tank at the bottom thereof for forcing the material up through and out of said pipe into the tank.

2. An apparatus of the character described, comprising a tank adapted to receive the material to be treated, a centrally-arranged material-conducting pipe suspended therein and terminating at a point removed from the bottom thereof, means arranged in operative relation with respect to the pipe and adapted to supply a medium for forcing the material up through and out of said pipe and into the tank, and a fluid-supply pipe opening into said conducting-pipe.

In testimony whereof I have hereunto set my hand, in presence of two subscribing witnesses, this 15th day of December, 1904.

FREDERICK CAPEL BROWN.

Witnesses:
ALBERT JAMES LOVINGTON,
GODEFROI DREW INGALL.